United States Patent
Soma et al.

[19]

[11] Patent Number: 5,805,542
[45] Date of Patent: Sep. 8, 1998

[54] OPTICAL DISK APPARATUS WITH A GROOVE/PIT AREA DISCRIMINATION CIRCUIT

[75] Inventors: Yasuhito Soma, Kadoma; Masayuki Shibano, Izumisano, both of Japan

[73] Assignee: Matsushita Electric Industrial Co., Ltd., Osaka-fu, Japan

[21] Appl. No.: 677,361

[22] Filed: Jul. 5, 1996

[51] Int. Cl.$^6$ .................................................. G11B 7/09

[52] U.S. Cl. ................................... 369/44.28; 309/44.29; 309/44.26; 309/58

[58] Field of Search ............................ 369/44.28, 44.29, 369/44.26, 44.25, 44.34, 56, 54, 58, 124, 44.35

[56] References Cited

U.S. PATENT DOCUMENTS

| | | |
|---|---|---|
| 4,999,826 | 3/1991 | Raaymakers et al. . |
| 5,268,883 | 12/1993 | Yamaguchi et al. . |
| 5,331,615 | 7/1994 | Yamada et al. . |
| 5,335,214 | 8/1994 | Natoba et al. ........................ 369/44.29 |
| 5,363,356 | 11/1994 | Tanaka ................................... 369/44.29 |
| 5,452,284 | 9/1995 | Miyagawa et al. .................. 369/44.26 |
| 5,508,995 | 4/1996 | Moriya et al. ....................... 369/275.4 |
| 5,615,185 | 3/1997 | Horikiri ................................ 369/44.29 |
| 5,638,354 | 6/1997 | Nakayama et al. .................. 369/44.26 |

*Primary Examiner*—Thang V. Tran
*Attorney, Agent, or Firm*—Wenderoth, Lind & Ponack

[57] ABSTRACT

An optical disk apparatus for recording and reproducing data to and from an optical disk has a pit area where data are recorded along a track by pits and a groove area where grooves are formed along a track to record data. The optical disk apparatus includes an optical head for projecting a light beam on the optical disk and a photodetector array for receiving the reflected light. A preamplifier is connected to the photodetector array for producing a tracking error signal and an RF signal representing the pits. The tracking error signal is used as a clock signal in flip-flops and the RF signal is used as an initial setting signal, so that the flip-flop produces a signal indicating that the optical head is in the pit area.

7 Claims, 7 Drawing Sheets

OPTICAL DISK APPARATUS WITH A GROOVE/PIT AREA DISCRIMINATION CIRCUIT

BACKGROUND OF THE INVENTION

1. Field of the Invention

The present invention relates to an optical disk apparatus for recording/reproducing data to an optical disk having a pit area where the recording is made by pits and a groove area where the recording is made by a surface physical change, such as a Kerr effect change.

2. Description of the Prior Art

Figure 7A:
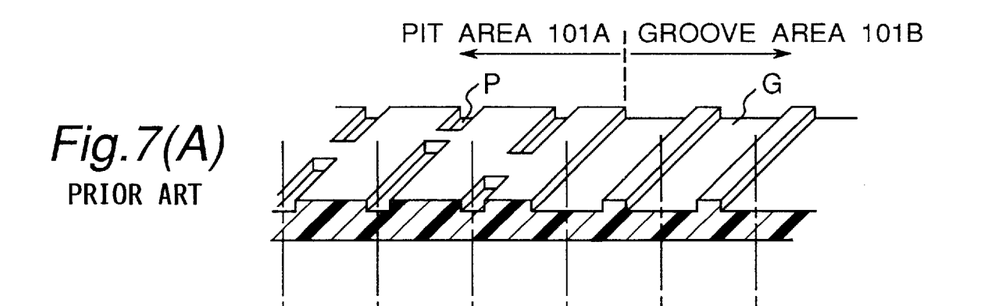
FIGS. 7(A), 7(B) and 7(C) are diagrams showing an arrangement of the pit area and groove area.

An optical disk with grooves is proposed, for instance, in U.S. Pat. No. 4,999,825, and is shown in FIG. 7(A). As shown in FIG. 7(A), the proposed optical disk has a pit area 101A in which tracks are provided with pits P, and a groove area 101B in which tracks are formed by grooves G wherein the surface markings, such as Kerr effect change markings, are provided for recording EFM-coded data as used in a compact disk.

It is generally known to provide a control area at the innermost periphery of the disk so as to store control data. The control data are recorded by projections and recessed pits at a predetermined position (e.g., in the innermost periphery) of the disk. Thus, the control area is usually formed in the pit area 101A. In addition to the control area, a recording area is provided for enabling a user to record data. The recording area is usually formed in the groove area 101B. The control data in the control area include an address indicating a starting point of the recording area, an address indicating a starting point of an area in which to record UTOC (User Table Of Contents) (referred to as a "UTOC area" hereinafter), an address indicating a head of an area in which to record user data, a recommended intensity of light during recording etc.

Figure 7B:
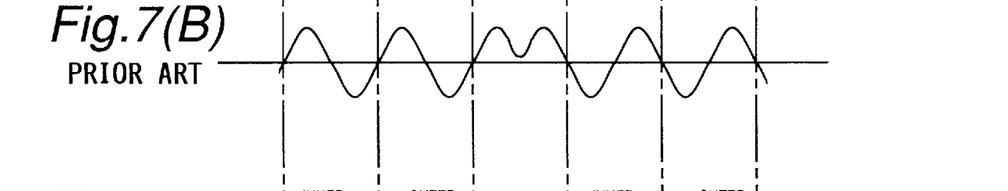
Figure 7C:
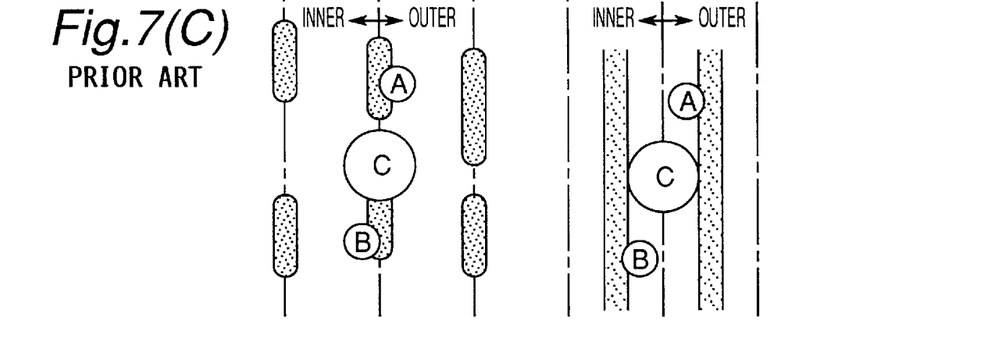

If the width of a pit is narrower than half a track pitch, and the width of a groove is wider than half the track pitch, the polarity of a tracking error signal is inverted between the pit area 101A and the groove area 101B, as shown in FIG. 7(B).

In the case of the pit area 101A, if the beam spot deviates from the track towards the outer side of the disk, the tracking error signal TE becomes greater than 0 and holds a positive value, and if the beam spot deviates from the track towards the inner side of the disk, the tracking error signal TE becomes less than 0 and holds a negative value.

In the case of the groove area 101B, however, if the beam spot deviates from the track towards the outer side of the disk, the tracking error signal TE becomes less than 0 and holds a negative value, and if the beam spot deviates from the track towards the inner side of the disk, the tracking error signal TE becomes greater than 0 and holds a positive value.

The above inversion in polarity of error signals results in incorrect servo control. For solving the problem, therefore, a conventional optical disk apparatus has been adapted to detect which one of the two areas (pit area and groove area) is being illuminated by beams spot, for example, by reading the address data, to thereby determine the polarity of the tracking error signal in accordance with the area. However, this arrangement in the optical disk apparatus has a problem that the address data cannot always be read quickly, because it is necessary to distinguish between two states when the address can not be read immediately. The first state is where the tracking servo is not correctly effected (thus requiring inversion of the polarity of the tracking error signal), and the second state is where the disk has a flaw or defect or is stained with foreign matter (not requiring inversion of the polarity of the tracking error signal). As a result, the optical disk apparatus can not be operated at a high velocity.

The above-discussed problem is particularly noticed when the pit area to record control data for the whole disk and the UTOC area are located in the vicinity of the innermost periphery of the optical disk and at an inner peripheral part of the disk close to the pit area, respectively. The optical disk apparatus reads the control data for the whole disk and contents of UTOC when it is started, to thereby make preparations for manipulations by the user. The apparatus is hence required to follow the procedures as below to read the UTOC after reading the control data: 1) To move an optical head to the area in the inner periphery of the disk recording the control data, 2) To read the control data, 3) To move the optical head to the groove area in accordance with the address of the head of the UTOC area in the control data, 4) To invert the polarity of the tracking error signal, 5) To execute servo tracking and read the address, and 6) To access the head of the UTOC area. Since the tracking servo is not correctly executed unless the optical head is surely brought to and positioned at the groove area, the conventional optical disk apparatus has been designed to move the optical head with a little room to an outer side rather than a position designated by the address of the head of the UTOC area in the control data. As such, the moving distance of the optical head in the above steps 3) and 6) cannot be reduced in the conventional apparatus, and consequently it takes time to start the apparatus.

SUMMARY OF THE INVENTION

The object of the present invention is therefore to provide an optical disk apparatus which can surely judge a pit area and a groove area of an optical disk before operating a tracking servo.

In order to achieve the aforementioned objective, an optical disk apparatus for recording/reproducing data to/from an optical disk having a pit area where data are recorded along a track by pits and a groove area where grooves are formed along a track to record data, said optical disk apparatus comprises: optical head means for projecting a light beam on said optical disk and producing an electric signal based on a reflecting light from the optical disk; first generating means for generating an RF signal based on said electric signal, said RF signal representing said pits; second generating means for generating a tracking error signal which is a waving signal based on said electric signal, and each wave representing traversing of said track; clock producing means for producing a clock signal using said wave signal; detecting means for detecting said RF signal and for producing an RF detection signal indicative of presence of said RF signal; and area detecting means for receiving said clock signal and said RF signal and producing a pit area detection signal when said optical head means is traversing a predetermined number of tracks.

By the above described optical disk apparatus of the present invention, the distinction or judgment between the pit area and groove area can be stably carried out even when the light beam is traversing the tracks. When the optical disk having the pit area and groove area is recorded or reproduced in the optical disk apparatus, the optimum tracking servo is achieved in accordance with the area owing to the above stable distinction between the pit area and groove area. Moreover, accessing to the vicinity of a boundary of the two kinds of areas can be carried out stably at high velocity.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The operation at the starting time of an optical disk apparatus according to a first embodiment of the present invention will be described hereinbelow with reference to FIGS. 1–4.

Figure 1:
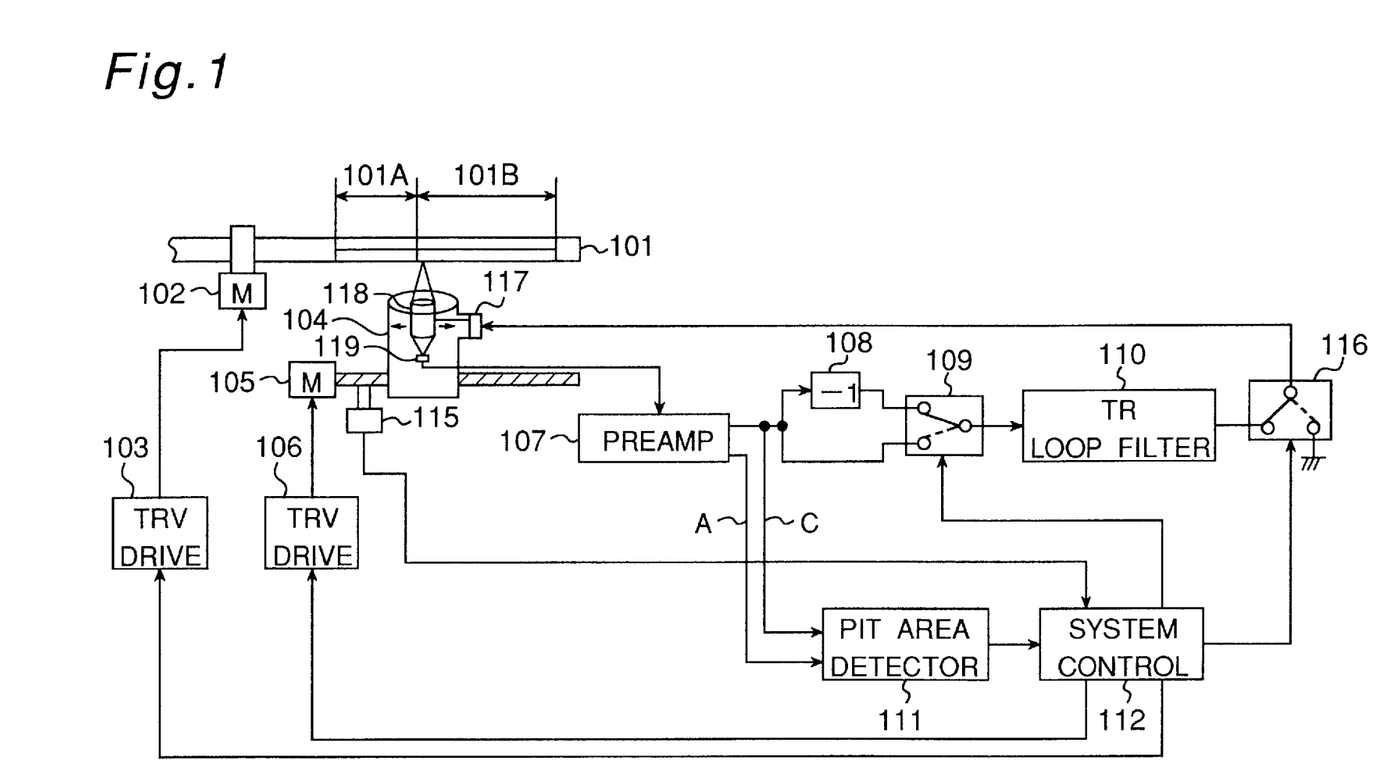
FIG. 1 is a block diagram of an optical disk apparatus according to a first embodiment of the present invention.

FIG. 1 is a block diagram of the optical disk apparatus according to the first embodiment. As shown in FIG. 7(A), an optical disk 101 has a pit area 101 A and a groove area 101B seen from the inner periphery thereof. A UTOC area is disposed in the vicinity of the innermost periphery of the groove area 101B. A spindle motor 102 driven and rotated by a motor driving circuit 103 rotates the optical disk 101. An optical head 104 has a lens 118 for condensing light beams, a tracking actuator 117 for moving the lens in a radial direction within the optical head 104 for fine adjustment, and a photodetector array 119 for converting the reflecting light from the optical disk to electric signals. The optical head 104 is moved in the radial direction by a traverse mechanism 105 which is driven by a traverse driving circuit 106. A preamplifier 107 adds or subtracts electric signals output from the photodetector array 119 in the optical head 104 to thereby generate and output a tracking error signal TE (C) or an RF signal (A).

Figure 2:
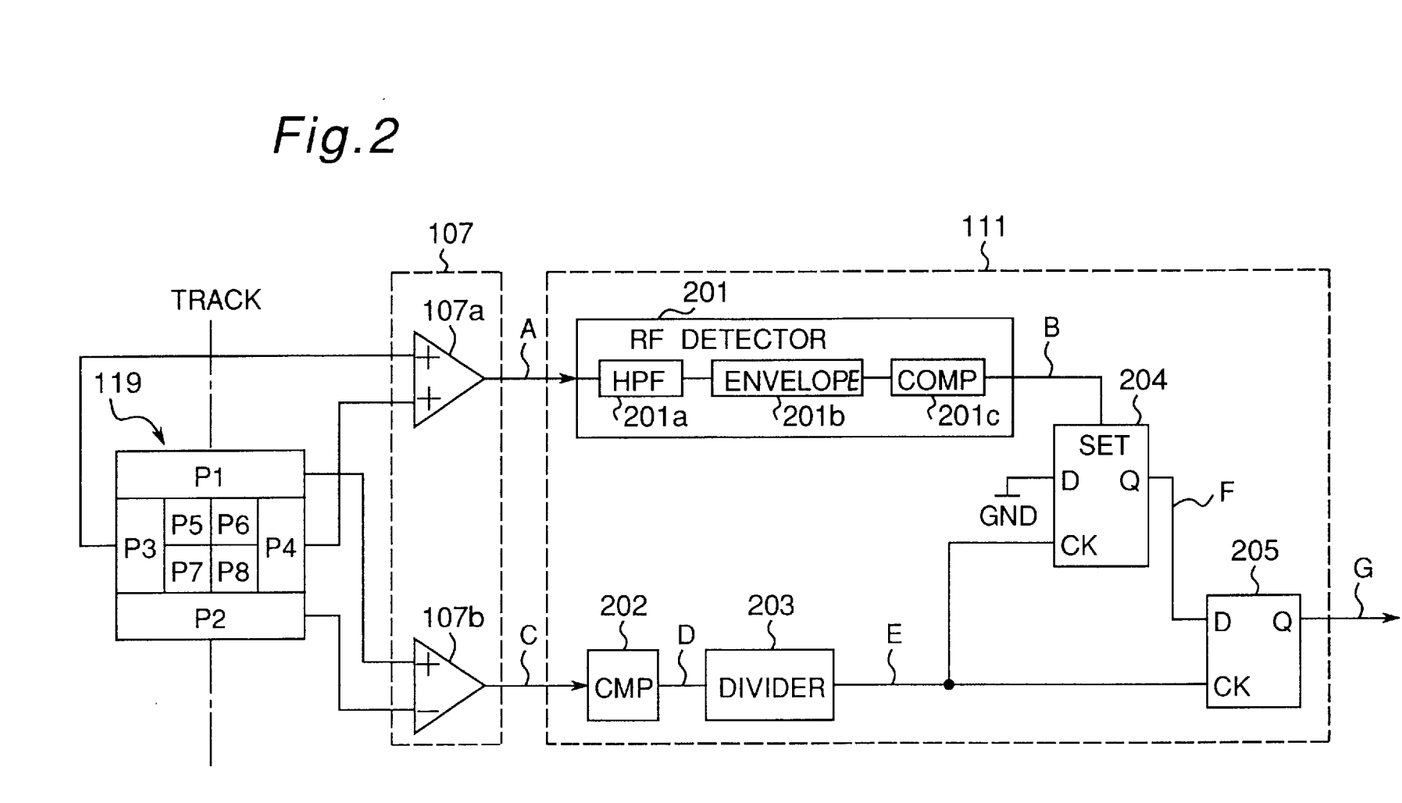
FIG. 2 is a detailed block diagram of a preamplifier and a pit area detection circuit shown in FIG. 1.

Referring to FIG. 2, a detail of the photodetector array 119 and the preamplifier 107 is shown. The photodetector array 119 has eight photodetector elements P1, P2, P3, P4, P5, P6, P7 and P8. The elements P1 and P2 are provided at the front and rear of the tracking direction, respectively, and elements P3 and P4 are provided at both sides of the tracking direction, respectively. Other elements P5, P6, P7 and P8 are provided in the center portion. The preamplifier 107 has an adder 107a and a subtractor 107b. Three beams are reflected from the disk and impinge on the photodetector array 119. The adder 107a adds the signals from elements P3 and P4 to produce a sum signal P3+P4 which is the same as the RF signal (A). The subtractor 107b subtracts the signal from element P2 from the signal from element P1 to produce a difference signal P1–P2 which is the same as the tracking error signal (C).

Referring to FIG. 1, the tracking error signal is inverted, i.e., multiplied by −1, by a TE reversing circuit 108. A TE switching circuit 109 is switched between the real line position for receiving the inverted tracking error signal and dotted line position for receiving the non-inverted tracking error signal, and a signal is input to a TR loop filter 110. The signal input to the TR loop filter is subjected to phase compensation, as explained below.

When a signal applied to the TR loop filter 110 is a positive signal (+signal), the loop filter 110 produces a positive actuation signal to the tracking actuator 117 to shift the lens 118 within the optical head 104 towards the inner side of the disk.

On the other hand, when the signal applied to the TR loop filter 110 is a negative signal (−signal), the loop filter 110 provides a negative actuation signal to the tracking actuator 117 to shift the lens 118 within the optical head 104 towards the outer side of the disk. The degree of shift is proportional to the amplitude of the actuation signal, i.e., proportional to the amplitude of the tracking error signal.

When the optical head 104 is in the pit area 101A, the switching circuit 109 should be turned to the dotted line position, and when the optical head 104 is in the groove area 101B, the switching circuit 109 should be turned to the real line position. This is further explained below.

In the case of pit area 101A, the switching circuit 109 is turned to the dotted line position. As shown in FIG. 7(B), when the optical head 104 deviates to move off the track towards the outer side of the disk (outside off-track condition), the tracking error signal changes from zero level to plus level. Since the switching circuit 109 is in the dotted line position, the TR loop filter 110 provides a positive actuation signal to the tracking actuator 117 to shift the lens 118 within the optical head 104 towards the inner side of the disk. Thus, the optical head 104 is returned to the center of the track (on-track condition). When the optical head 104 deviates and falls in the inside off-track condition, the tracking error signal changes from zero level to minus level. Thus, the TR loop filter 110 provides a negative actuation signal to the tracking actuator 117 to shift the lens 118 within the optical head 104 towards the outer side of the disk. Thus, the optical head 104 is returned to the on-track condition.

On the other hand, in the case of groove area 101B, the switching circuit 109 is turned to the real line position. As shown in FIG. 7(B), when the optical head 104 deviates and falls in the outside off-track condition, the tracking error signal changes from zero level to minus level, but is changed to plus level by the inverter 108. Thus, the TR loop filter 110 provides a positive actuation signal to the tracking actuator 117 to shift the lens 118 within the optical head 104 towards the inner side of the disk. Thus, the optical head 104 is returned to the on-track condition. When the optical head 104 deviates and falls in the inside off-track condition, the tracking error signal changes from zero level to plus level, but is changed to minus level by the inverter 108. Thus, the TR loop filter 110 provides a negative actuation signal to the tracking actuator 117 to shift the lens 118 within the optical head 104 towards the outer side of the disk. Thus, the optical head 104 is returned to the on-track condition.

The switching circuit 109 is switched by a system control 112 which can detect whether the optical head (104) is in the pit area 101A or it is in the groove area 101B.

A switch 116 is connected to the output of the TR loop filter 110. When the switch 116 is switched to the real line position, the output of the TR loop filter 110 is connected to the tracking actuator 117. When the switch 116 is switched to the dotted line position, the connection between the TR loop filter 110 and the tracking actuator 117 breaks, and the input to the tracking actuator 117 is grounded. The switch 116 is turned to the real line position when the optical head 104 follows along the track (i.e., in the play or recording mode), but is turned to the dotted line position when the optical head 104 traverses the tracks (i.e., in the seek mode).

The tracking error signal (C) and RF signal (A) are input to a pit area detection circuit 111 which produces a pit detection signal (F). The system control 112 receives the pit detection signal (F) and controls the TE switching circuit 109, switch 116, traverse driving circuit 106 and spindle driving circuit 103.

FIG. 2 shows a detail of the pit area detection circuit ill which includes an RF detection circuit 201, comparator 202, frequency divider 203, flip-flops 204 and 205. The pit area detection circuit 111 is operated when the optical head 104 is not following the track, but traversing the tracks as effected by the traverse drive 106 or a forced traverse drive 501 which is explained later in connection with FIGS. 5 and 6.

Figure 3A:
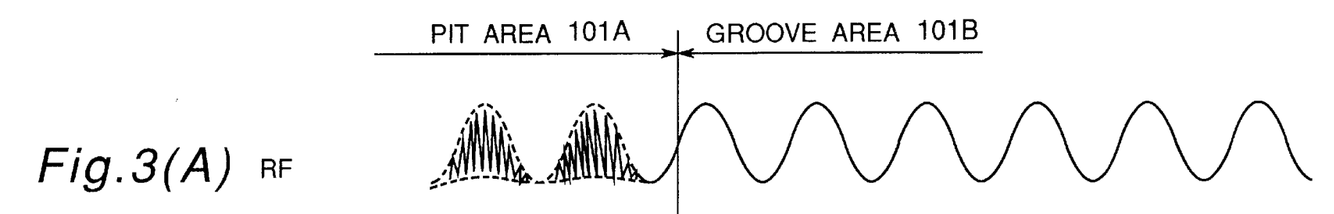
FIGS. 3(A), 3(B), 3(C), 3(D), 3(E), 3(F) and 3(G) are waveforms observes at various points in the circuit of FIGS. 1 and 2.

The RF detection circuit 201 has a high pass filter 201a, an envelope detector 201b and comparator 201c. The high pass filter 201a receives the RF signal (A) (FIG. 3 (A)) to cut off the low frequency components. During the traverse of optical head 104, a high frequency signal gradually changing in sinusoidal curve is produced when the optical head 104 is in the pit area 101A, but a low frequency sinusoidal curve is produced when the optical head 104 is in the groove area 101B.

In other words, the amplitude of the RF signal changes as shown in FIG. 3(A), because the relative position of the track and light beam is not fixed when the tracking servo is not carried out, e.g., at the accessing time or the like. The RF signal includes high frequency components in the pit area 101A because the pits there show a large amplitude at an on-track part and a small amplitude at an off-track part. Meanwhile, the RF signal does not include high frequency components in the absence of pits in the groove area 101B and accordingly changes high and low every time one track is traversed.

Figure 3B:
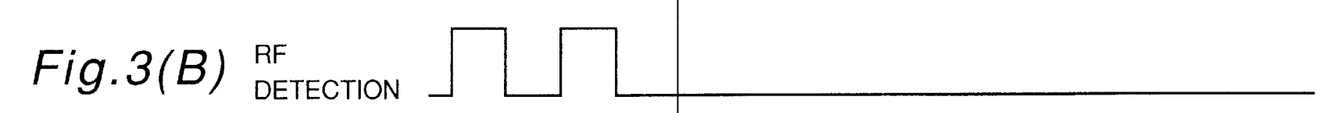
Figure 3C:
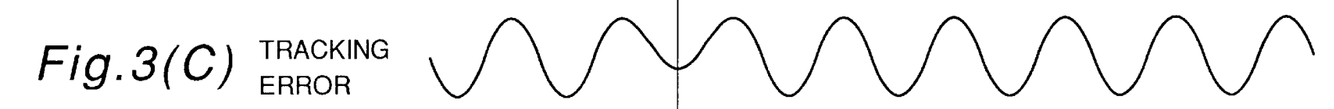
Figure 3D:
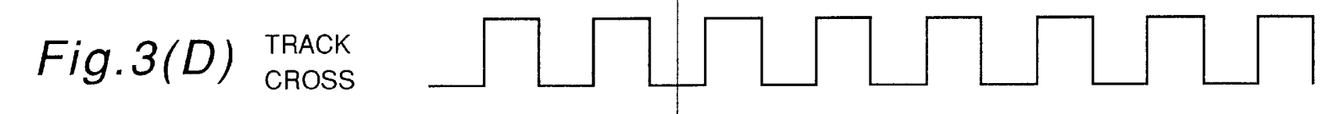
Figure 3E:
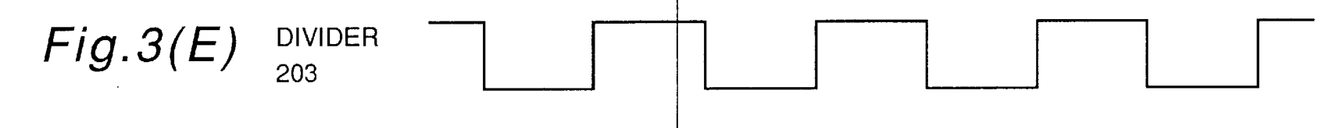

The high pass filter 201a cuts off the low frequency component, and the envelope detector 201b detects the envelope curve of the high frequency signal. Then, the comparator 201c compares the envelop curve with a predetermined threshold to produce pulses in the pit area and no pulses in the groove area, as shown in FIG. 3(B). The signal shown in FIG. 3(B) is referred to as an RF detection signal. The RF detection signal shows a HIGH level signal in the pit area 101A when the optical head 104 traverses on track. The comparator 202 receives the tracking error signal as shown in FIG. 3 (C). Here, the tracking error signal is in the sinusoidal curve, because the optical head 104 is traversing the tracks. The comparator 202 compares the tracking error signal with a predetermined threshold to produce pulses (FIG. 3(D)) corresponding to each track. The threshold value may be provided with hysteresis to prevent chattering. The signal shown in FIG. 3(D) is referred to as a track cross signal. The frequency divider 203 divides the frequency of the track cross signal to half the frequency.

Figure 3F:
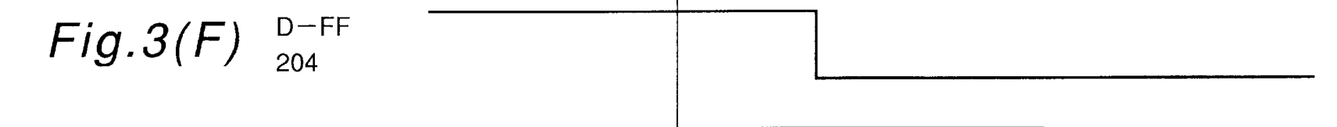

Flip-flop 204 has a set terminal receiving the RF detection signal. When the signal at the set terminal is a HIGH level signal, a Q output of flip-flop 204 always produces a HIGH level signal even when the clock signal is applied to clock terminal CK. When the signal at the set terminal is a LOW level signal, the Q output hold the signal that has been producing, but is changed to the signal applied to the data input D, which is a LOW level signal in this case, in response to each step-up edge of the clock signal applied to the clock terminal CK. The clock signal is the output of the frequency divider 203. Thus, as shown in FIG. 3(F), the Q output of flip-flop 204 produces a HIGH level signal during when the optical head 104 is in the pit area, but is changed to a LOW level signal in response to the first step-up edge of the clock signal (FIG. 3(E)) in the groove area.

Figure 3G:
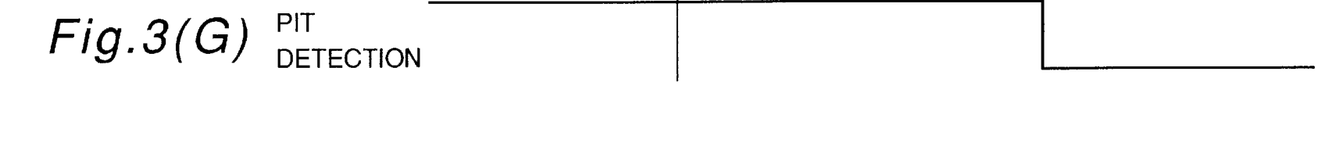

Flip-flop 205 has a data input D which receives the Q output of flip-flop 204, and a clock input CK which receives the output from the frequency divider 203. The Q output is changed to the signal at the data input in response to the step-up edge of the clock signal. Thus, as shown in FIG. 3(G), the Q output of flip-flop 205 produces a HIGH level signal during when the Q output of flip-flop 204 is producing a HIGH level signal, but is changed to a LOW level signal in response to the second step-up edge of the clock signal (FIG. 3(E)) in the groove area.

The optical head 104 is generally referred to as an optical head means; comparator 202 and frequency divider 203 as a clock producing means for producing a clock signal which is in relation to the tracks traversed; preamplifier 107 as an RF signal generating means; RF detection circuit 201 as an RF detecting means; and a circuit comprising D flip flops 204 and 205 as a pit area detecting means.

Figure 4:
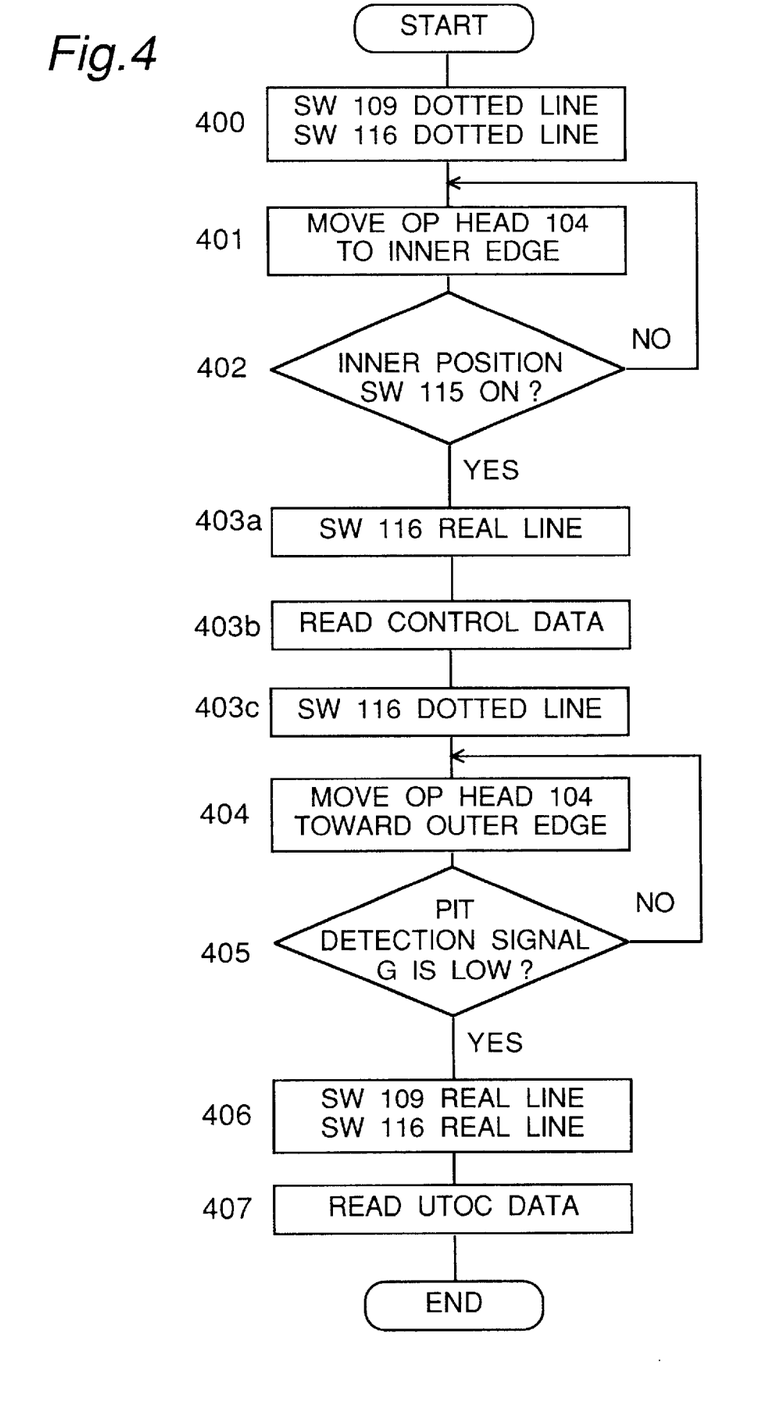
FIG. 4 is a flow chart showing the steps carried out by a system control shown in FIG. 1.

FIG. 4 is a flow chart showing the steps executed by the system control 112 of the first embodiment.

In operation, first the switch 109 is turned to the dotted line position, and the switch 116 is turned to the dotted line position (step 400). Then, the spindle driving circuit 103 rotates the optical disk 101, and simultaneously, the optical head 104 is moved in a direction towards the inner periphery of the optical disk by the traverse driving circuit 106 (step 401) until a detection switch 115 is turned ON (step 402). The detection switch is adjusted beforehand so as to be turned ON when the optical head is brought to a position where the control data can be read. Then, the switch 116 is turned to the real line position (step 403a), ready for the tracking control.

When the spindle driving circuit 103 drives the spindle motor 102 and consequently the optical disk 101 is rotated at a predetermined number of revolutions, the system control 112 starts the focus/tracking servo to read the control data recorded in the pit area 101A (step 403b). After finishing the reading of control data, the system control 112 frees the tracking servo by turning the switch 116 to the dotted line position (step 403c). Then, the optical head 104 is moved towards the outer periphery by the traverse driving circuit 106 (step 404) until the pit detection signal FIG. 3(G) is changed to the LOW level signal (step 405).

As explained above, the pit detection signal is a HIGH level signal in the pit area 101A and changes to a LOW level signal when the optical head 104 enters the groove area 101B. Therefore, if the optical head 104 is stopped in response to the change of the pit detection signal from HIGH to LOW level signal, the optical head 104 can be positioned in the vicinity of a boundary between the pit area 101A and the groove area 101B, i.e., in the vicinity of the UTOC area. When the optical head 104 stops, the switch 109 is changed to the real line position (step 406) to inverts the polarity of the tracking error signal, and the switch 116 is also changed to the real line position (step 406) to start the tracking servo. The UTOC area is then accessed, and the UTOC data is read (step 407).

According the present invention, it is not necessary to move the optical head 104 for a long distance towards the outer periphery to access the UTOC area. Therefore, accessing to the UTOC area can be done in a short time. Thus, the time necessary for the initial set up can be shortened, and the user may not need to wait a long time before he or she can start using the disk.

Also, even when the tracking servo is not effective, the pit detection signal can be obtained stably to thereby stabilize the operation of the optical disk apparatus. Moreover, the pit detection signal can be obtained per track if the frequency divider 203 is omitted. In this case, it is not necessary to take into account the two track traversing distance of the optical head to access the UTOC area. Thus, the initial setting time can be further reduced, and the optical disk apparatus can be operated at a high speed.

Figure 5:
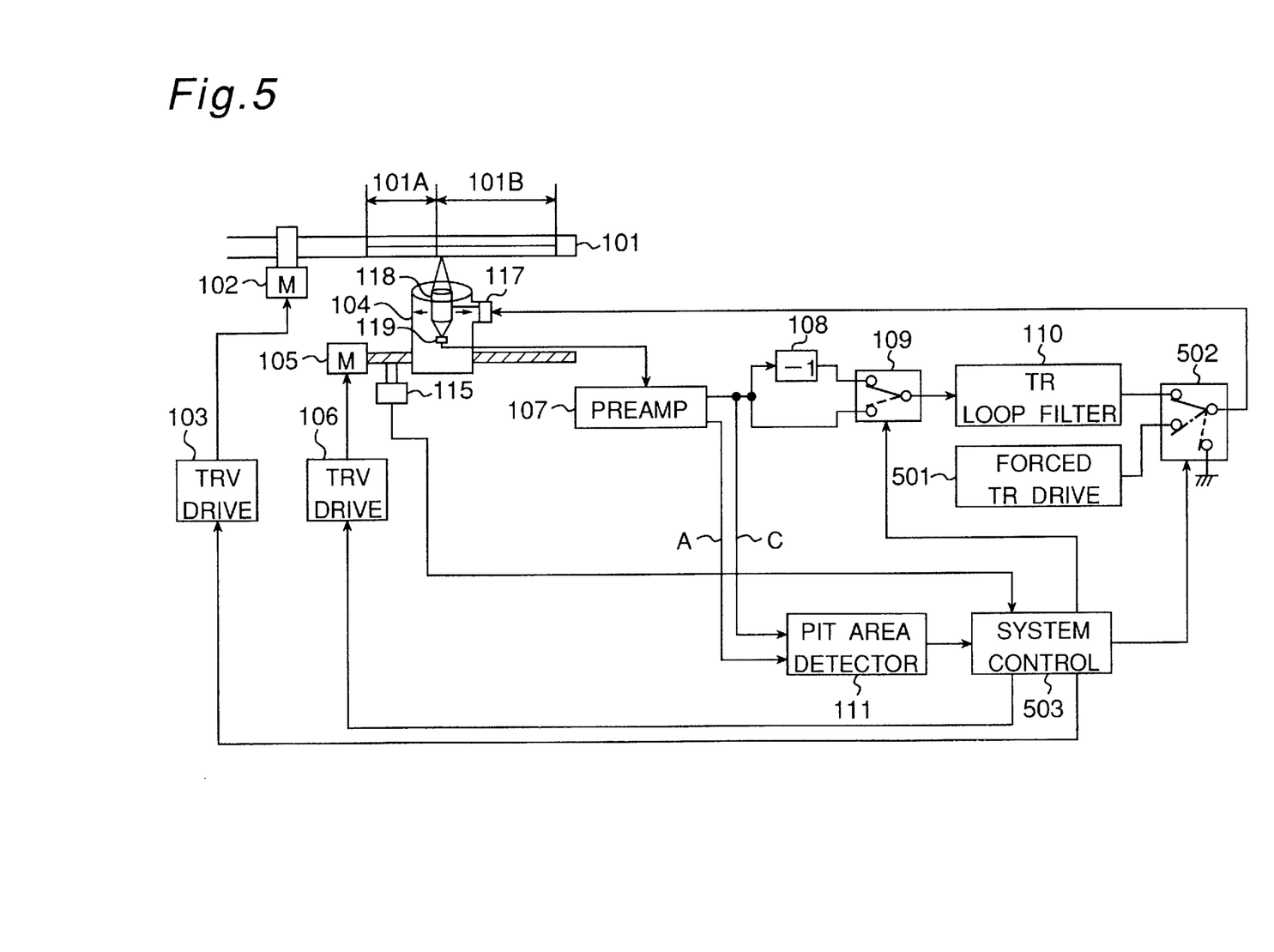
FIG. 5 is a block diagram of an optical disk apparatus according to a second embodiment of the present invention.

The traversing speed of the light beam when traversing the track for the detection of the pit area is considered. The pit area detection circuit 111 described above obtains the traversing number of tracks with the use of the track cross signal so as to detect the pit area. The track cross signal is a binary signal of the tracking error signal and often accompanies burr-like noise signals in the output of the comparator in the vicinity of a zero crossing point if the traversing speed is decreased and chattering takes place in the comparator. For example, although there is no problem when the pit detection signal is taken while the optical head 104 is moved in the radial direction by the traverse mechanism 105 as in the first embodiment, there will be a problem when the optical head stops at the middle of the disk and when it becomes necessary to judge between the pit area and groove area. FIG. 5 is a block diagram of an optical disk apparatus designed to eliminate this problem.

A second embodiment will be discussed with reference to FIGS. 5 and 6.

When compared with the embodiment of FIG. 1, the embodiment shown in FIG. 5 differs in the following points.

A forced TR driving circuit 501 is provided which is formed by a constant voltage source such as for producing +Vc or –Vc.

A switch 502 is provided to be selectively turned to one of three positions: the real line position for the connection with the TR loop filter 110; the dotted line position for the connection with the ground; and the dot-dash line position for the connection with the forced TR driving circuit 501. The output of the switch 502 is connected to the tracking actuator 117.

When the switch 502 is in the dot-dash line position, the constant voltage +Vc is applied to the tracking actuator 117 for shifting the lens 118 towards the inner side of the disk at a speed determined by the voltage +Vc. Thus, the light beam traverses the tracks forcibly to carry out the area detection by the pit area detector 111. When the forced TR driving circuit 501 holds a constant voltage –Vc instead of +Vc, the tracking actuator 117 shifts the lens 118 towards the outer side of the disk, and the same result can be obtained.

A system control 503 controls the traverse driving circuit 106, TE switching circuit 109 and also the TR driving signal switching circuit 502.

Figure 6:
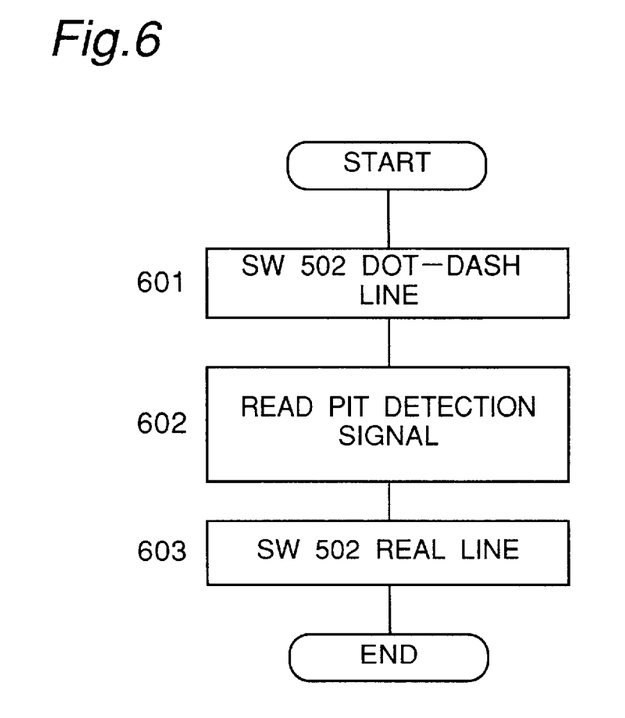
FIG. 6 is a flow chart showing the steps carried out by a system control shown in FIG. 5.

FIG. 6 is a flow chart showing the operation of the optical disk apparatus of the second embodiment.

The objective lens in the optical head 104 is generally referred to as a light condensing means; the tracking actuator in the optical head as a tracking actuator; forced TR driving circuit 501 to as a forced TR driving means; and system control 503 as a control means.

Prior to taking the pit detection signal, the system control 503 turns the switching circuit 502 to the dot-dash line position (step 601) to connect the forced TR driving circuit 501 with the tracking actuator 117. A forced driving signal, such as +Vc, output from the forced TR driving circuit 501 is applied to the tracking actuator 117 in the optical head 104, so that the objective lens is moved in the radial direction at relatively high speeds (for instance, traversing frequency of 5 kHz). Then, pit area detector 111 produces the pit detection signal while the objective lens is moving (step 602). The switch 502 is then turned back to the real line position to connect the TR loop filter 110 with the tracking actuator 117.

In the above-described manner, when the pit detection signal is taken, the objective lens is forcibly moved in the radial direction, so that the pit area can be detected with influences of noises removed in the vicinity of the zero crossing point of the track cross signal.

The forced driving signal generated from the forced TR driving circuit 501 is, instead of ±Vc, preferably a sinusoidal signal of the primary resonant frequency or lower frequency of the tracking actuator. Vibrations of the lens subsequent to the impression of the forced driving signal can be prevented if such a signal of the above frequency is applied. The operation afterwards is carried out quickly and stably. Needless to say, a pulse-like voltage may be applied alternatively.

While the pit area is detected every two tracks traversed in the first embodiment, the dividing rate of the frequency divider 203 is desired to be set in accordance with the estimated amount of eccentricity. For instance, in the case where the amount of eccentricity is 100 μm with the track pitch of 1.6 μm, the dividing rate is set to be not smaller than 63 (100/1.6=62.5). The light beam is thus prevented from being moved from the groove area 101B to the pit area 101A due to the eccentricity after the pit detection signal is read before the tracking servo is completed.

Although the track cross signal is used to detect the traversing number of tracks in the first and second embodiments, a signal obtained by binarizing an envelope signal of the RF signal, etc., that is, any signal indicating the traversing number of tracks by the light beam, can be used.

Further, although the pit area 101A is detected every two tracks traversed in the first and second embodiments, the pit area may be detected per any number of tracks traversed. In addition, the number may be not a fixed value, but may be changed in accordance with the quality of the RF detection signal or track cross signal. For example, during moving of the optical head 104 in the radial direction in the pit area 101A, the RF detection signal and track cross signal are monitored to detect the number of times the RF detection signal changes as the track is traversed. Then, the number of tracks to be traversed for the area detection is determined based on the detected number of times. The number of tracks to be traversed for the area detection can be reduced if the traversing speed is high, or increased if the amplitude of the RF signal is low.

According to the first and second embodiments, envelope circuit 201b can be eliminated to detect the RF detection signal from the high frequency components extracted from the RF signal, or other methods may be employed.

It is so arranged in the foregoing first and second embodiments that the HIGH level signals are produced when the pits are detected. Instead, it is possible to arrange the embodiments such that LOW level signal are produced when the pits are detected.

The optical disk referred to in the first and second embodiments has the pit area and groove area in the inner peripheral part and outer peripheral part thereof, respectively. The same effect is attained even with an optical disk having the pit area and groove area in the outer peripheral part and inner peripheral part, respectively, or an optical disk having a plurality of pit areas and a plurality of groove areas.

The first embodiment describes an example of the pit area detection circuit. The arrangement may be varied so long as the circuit is adapted to detect the presence/absence of high frequency components in the RF signal in accordance with the number of tracks traversed by the light beam. For example, the RF detection signal can be latched at a step-up edge of the track cross signal, and the pit detection signal is turned to a HIGH level if the latched result is high. Or the RF signal is latched by the track cross signal a predetermined number of times and the pit area is detected in accordance with the number of times when the latching result is high. The same effect as in the first embodiment is obtained likewise.

In the second embodiment, the switch 502 is switched to the TR loop filter 101 after the pit detection signal is taken. The same effect of the invention as above is achieved even when the switch 502 is allowed to select another state, e.g., a without a driving signal or the like state, and is brought into such state after the pit detection signal is taken inside.

As described hereinabove, when the optical disk has both the pit area and the groove area, the pit area and groove area can be detected according to the present invention, so that a stable tracking servo is ensured. Moreover, accessing to the UTOC area can be carried out at high velocity in the optical disk apparatus according to the present invention.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An optical disk apparatus for recording/reproducing data to/from an optical disk having a pit area where data are recorded along a track by pits and a groove area where grooves are formed along a track to record data, said optical disk apparatus comprising:

optical head means for projecting a light beam on said optical disk and producing an electric signal based on a reflecting light from the optical disk;

first generating means for generating an RF signal based on said electric signal, said RF signal representing said pits;

second generating means for generating a waving signal based on said electric signal, and each wave representing traversing of said track;

clock producing means for producing a clock signal using said waving signal;

detecting means for detecting said RF signal and for producing an RF detection signal indicative of presence of said RF signal; and area detecting means for receiving said clock signal and said RF detection signal and producing a pit area detection signal when said optical head means is traversing a predetermined number of tracks.

2. An optical disk apparatus according to claim 1, wherein said optical head comprises a tracking actuator moving a source of light beam in a radial direction.

3. An optical disk apparatus according to claim 2, further comprising tracking error generating means for generating a tracking error signal based on said electric signal; and a loop filter for receiving said tracking error signal and for producing an actuation signal to actuate said tracking actuator, whereby said light beam is maintained on said track.

4. An optical disk apparatus according to claim 3, wherein said pit area detection signal is used for changing the polarity of said tracking error signal between the tracking error signal in said pit area and that in said groove area.

5. An optical disk apparatus according to claim 3, further comprising a disconnecting means for disconnecting said tracking actuator from said loop filter when said light beam is to traverse the tracks.

6. An optical disk apparatus according to claim 2, further comprising a forced tracking drive means for producing a forced signal to said tracking actuator for forcibly making said light beam to traverse the tracks.

7. An optical disk apparatus according to claim 1, wherein said predetermined number of tracks is greater than a number of tracks covered by an amount of eccentricity of the optical disk.

\* \* \* \* \*

UNITED STATES PATENT AND TRADEMARK OFFICE
CERTIFICATE OF CORRECTION

PATENT NO. : 5,805,542
DATED : Sept. 8, 1998
INVENTOR(S) : Yasuhito SOMA et al.

It is certified that error appears in the above-indentified patent and that said Letters Patent is hereby corrected as shown below:

On the title page, item

[22], the following data is inserted:

--[30]    Foreign Application Priority Data
    July 7, 1995    [JP]    Japan ............ 7-171843--.

Signed and Sealed this

Nineteenth Day of January, 1999

Attest:

Attesting Officer

*Acting Commissioner of Patents and Trademarks*